R. H. RICE & J. G. CALLAN.
GOVERNOR.
APPLICATION FILED NOV. 10, 1908.
1,013,062.
Patented Dec. 26, 1911.
4 SHEETS—SHEET 3.
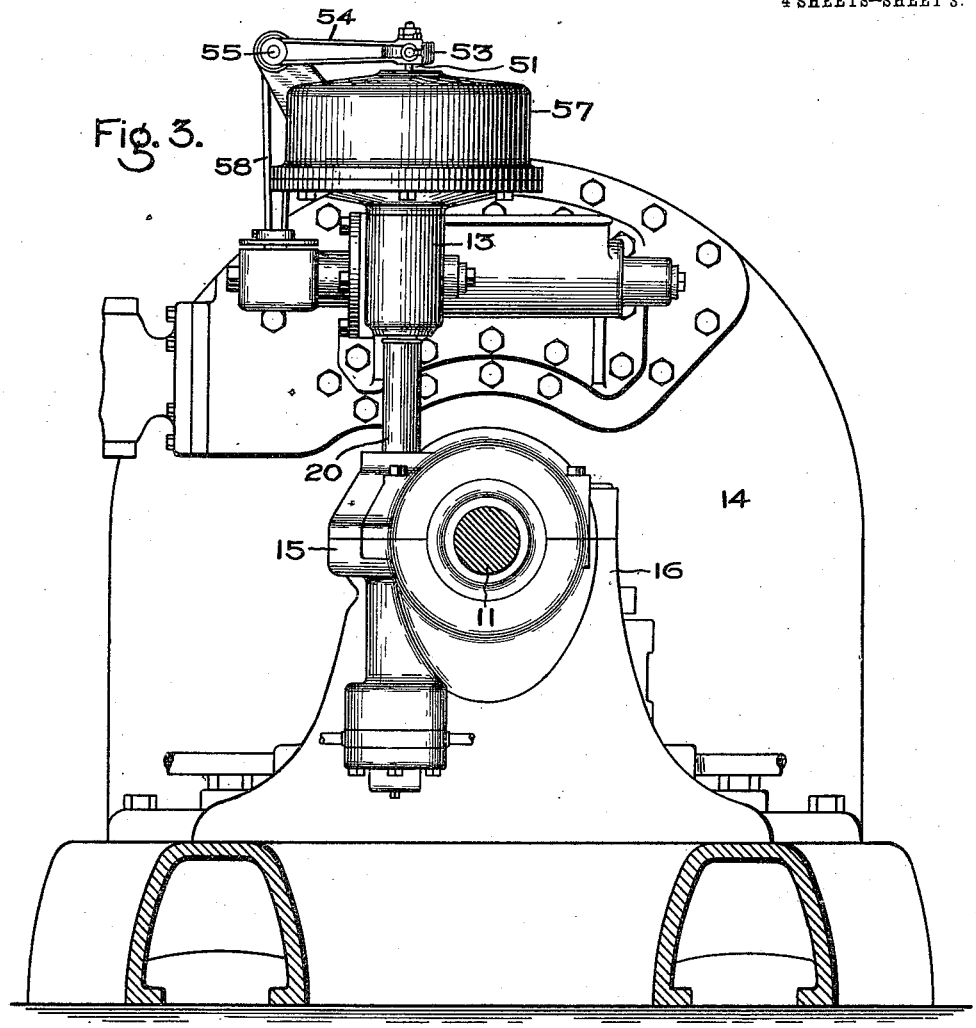
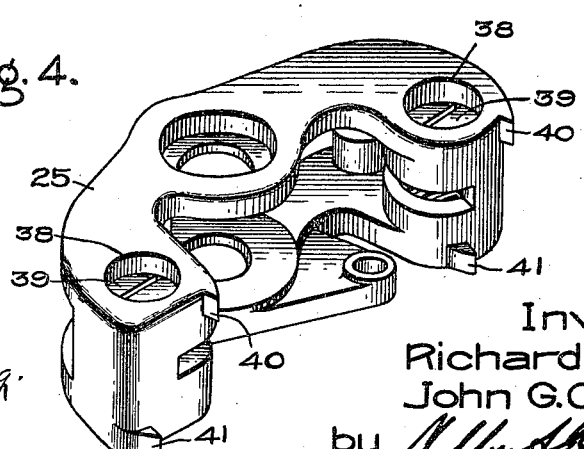
Witnesses:
Marcus L. Byng.
J. Ellis Glen
Inventors,
Richard H. Rice,
John G. Callan,
by
Att'y.

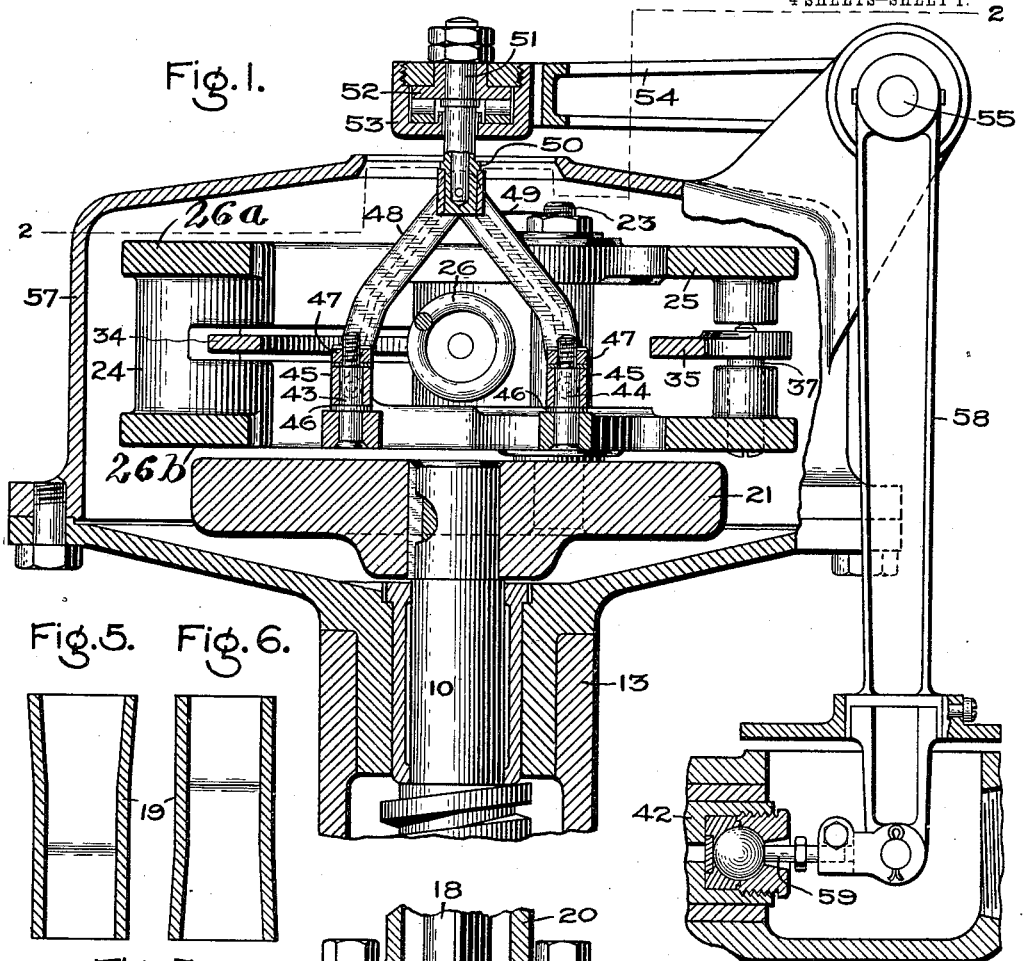

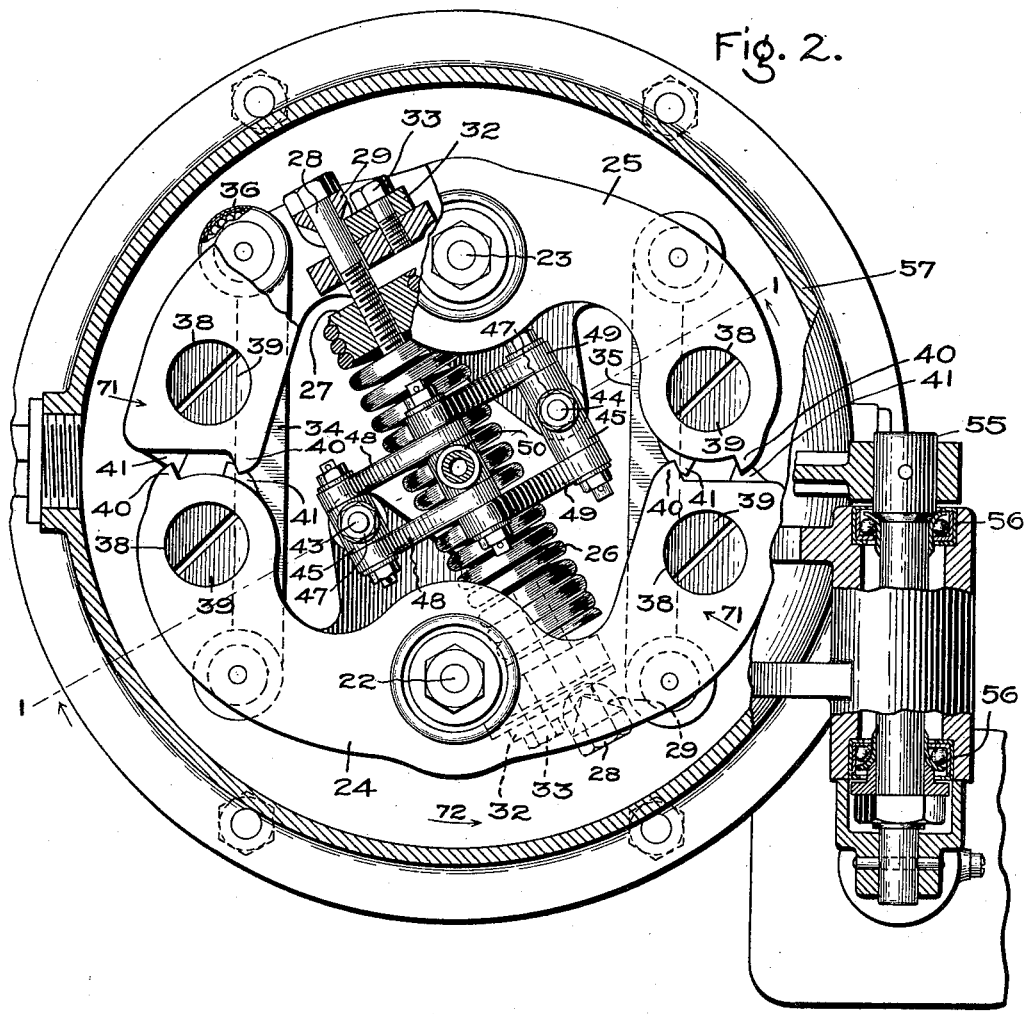
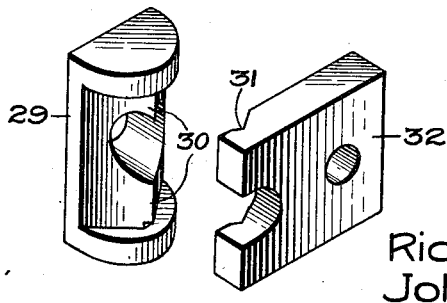

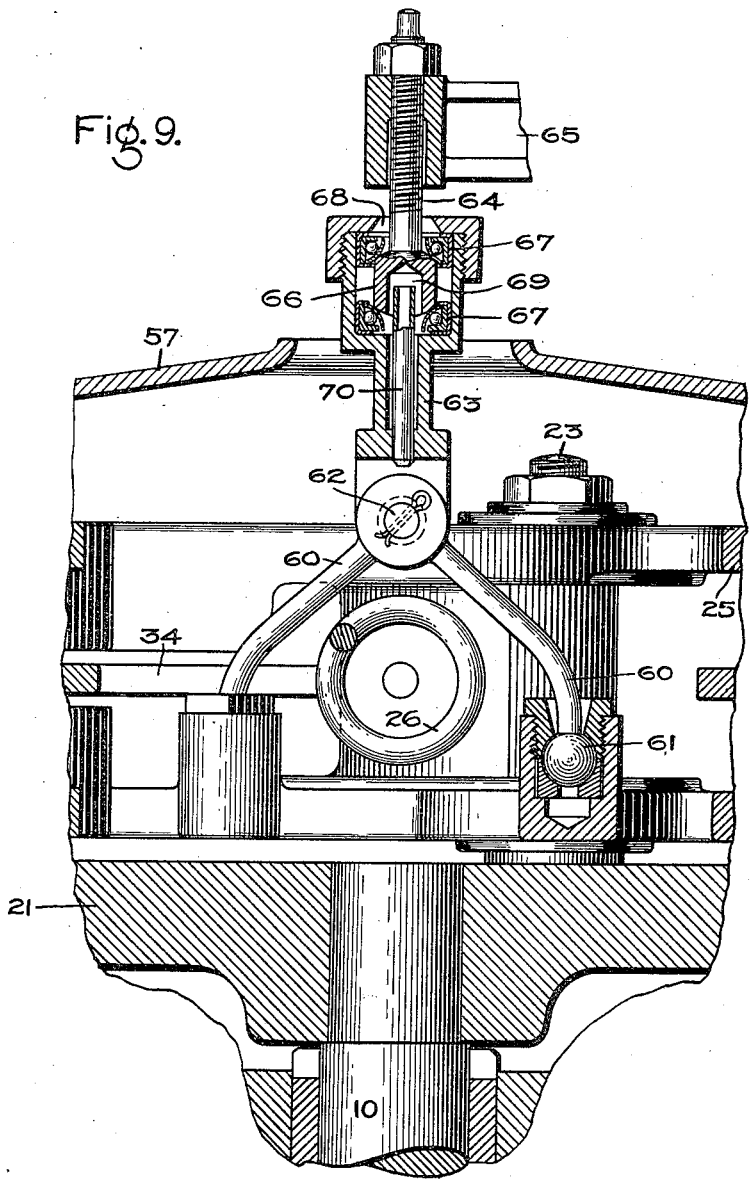

UNITED STATES PATENT OFFICE.

RICHARD H. RICE, OF LYNN, AND JOHN G. CALLAN, OF NAHANT, MASSACHUSETTS, ASSIGNORS TO GENERAL ELECTRIC COMPANY, A CORPORATION OF NEW YORK.

GOVERNOR.

1,013,062. Specification of Letters Patent. Patented Dec. 26, 1911.

Application filed November 10, 1908. Serial No. 461,852.

*To all whom it may concern:*

Be it known that we, RICHARD H. RICE, a citizen of the United States, residing at Lynn, county of Essex, State of Massachusetts, and JOHN G. CALLAN, a citizen of the United States, residing at Nahant, county of Essex, State of Massachusetts, have invented certain new and useful Improvements in Governors, of which the following is a specification.

This application is a continuation of our pending application, Serial No. 371,407, filed May 2, 1907, as to all of its subject matter except so much of the mechanism of Fig. 9 as was not disclosed in the earlier application, and is filed because of a requirement for division made in said pending application by the United States Patent Office under the provisions of Rules 41 and 42 of Office practice.

The invention relates to automatic governing devices such as are used in controlling the operation of steam, gas or other engines or turbines, and the object of the invention is the provision of a governor for said purpose which is of improved construction and capable of performing its functions in an efficient manner.

For an understanding of the invention reference should be had to the following description and claims wherein its novel features are more particularly set forth and to the accompanying drawings illustrating certain embodiments of the invention as applied to a steam turbine. But obviously the governor can be used with other turbines than the particular type illustrated and with apparatus other than turbines.

Figure 1 of the drawings is an axial section of the governor and a portion of its driving shaft with some of the parts broken away, the section being taken on the line 1—1 of Fig. 2; Fig. 2 is a top view of the governor, the inclosing casing being in section on the line 2—2 of Fig. 1; Fig. 3 is an end view of the governor as used with one type of turbine; Fig. 4 is a perspective view of one of the governor weights; Figs. 5, 6 and 7 are detail views of the couplings for uniting the parts of the governor shaft; Fig. 8 is a perspective view of one of the knife-edge pivots between ends of the governor spring and the weights; and Fig. 9 is a partial axial section of a slightly modified form of governor.

The governor shaft 10 is illustrated as a vertical shaft located at one side of the main turbine shaft 11, but it can occupy other positions when the conditions under which the governor is to operate make it desirable or necessary. The shaft 10 is driven at a speed proportional to but less than the speed of the shaft 11, by suitable gearing between the shafts, such as a worm (not shown) on the shaft 11, and a worm-wheel 12 on the shaft 10. The upper end of the shaft 10 is mounted in a bracket 13 on the turbine casing 14. The lower end of the shaft 10 is mounted in a bracket 15 on the pillow block 16. In order to prevent any relative displacement of the portions of the shaft and their brackets and the parts by which the latter are carried from affecting the operation of the governor, the shaft is formed in sections and a coupling is provided between the upper and lower portions, said coupling comprising an intermediate shaft section 18 and a pair of hollow members 19, Figs. 5, 6 and 7, of rectangular cross section, each member receiving the squared end of one of the portions of the shaft 10 and also an end of the intermediate shaft section 18. The hollow members closely engage the squared ends of the shafts on both sides while a slight clearance is provided at the ends, the clearance at one end of a member being displaced 90° from that at the other so as to compensate for any lack of alinement. In the drawings only the lower coupling is shown, the arrangement of the upper coupling being similar to that of the lower one. In so far as the operation of our improved mechanism is concerned the upper and lower portions of the shaft 10 with the coupling between them may be regarded as one shaft. The coupling is inclosed in a suitable casing 20.

The governor might be arranged on the shaft 11 but the arrangement illustrated makes the whole machine more compact and by mounting the governor on the secondary shaft 10 rotating at a slower speed, the difficulties incident to balancing it are lessened and also those incident to the transmission of motion from the governor to the rod or shaft controlled thereby and operating the motive fluid admission devices of the turbine or other machine. Since the speed of the shaft 10 is relatively low, it follows that the lubrication of the parts is simplified and made more certain and the relative surface speed between the rotating and non-rotating members is small. Such a shaft speed also permits the use of a simple and powerful governor of the centrifugal and inertia type. This governor includes a disk 21 keyed to the upper end of the shaft 10. Rising vertically from the disk are two pivots 22, 23, Fig. 2, for the governor weights 24, 25. The construction of the weights is shown in detail in Fig. 4. The mass of the weights 24 and 25 is distributed about the pivots 22 and 23 in accordance with well known principles so that a portion of each weight operative by its inertia but inoperative as to centrifugal force coöperates with another portion which is adapted to effect the movement of the regulating devices by centrifugal force, to produce rapid and accurate adjustment of the governor elements and efficient regulation of the apparatus. As the shaft 10 rotates, the weights revolve about its axis and under the influence of centrifugal force and inertia adjust the mechanism which controls the supply of motive fluid to the turbine or engine. The outward movement of the weights is opposed by an extension spring 26 located between the weights and supported by them, Fig. 2. The ends of the spring are provided with nuts or plugs 27 with which adjusting screws 28 engage. In order to reduce friction as much as possible at the points of attachment between the weights and the spring, each of the adjusting screws 28 passes through a member 29, Fig. 8, having a knife-edge 30 that engages a seat 31 in the block 32 secured to a projection on the weight by a bolt 33. In order that both weights shall have equal angular movements about their pivots for a given change in speed, they are connected by links 34, 35, located on opposite sides of the pivots and about midway of the weights in a vertical direction. Suitable anti-friction bearings such as are illustrated at 36, Fig. 2, are provided between the links and the pivot studs 37. As will be noted, the upper or outer faces 26ᵃ (Fig. 1) of the weights are in a plane perpendicular to the axis of rotation and the lower or inner faces 26ᵇ lie in a plane parallel to the first plane, while the spring 26 and its knife edge bearings and the links 34, 35 are arranged between said planes.

It sometimes happens that it is necessary to change the mass of one or both of the weights to obtain proper action of the governor. For this purpose screw-threaded openings 38, Fig. 4, are made in the weights and threaded plugs 39 are located therein. By varying the size and weight of these plugs it is evident that the effective action of the governor weights can be regulated, and since each weight is provided with two of these plugs, a wide range of adjustment may be obtained by adding metal to one end of a weight and removing it from the other. To limit the outward movement of the weights in case of excessive speed, lugs 40, 41 are provided on each weight, the lugs 40 acting to limit the outward movement of the weights and the lugs 41 the inward movement thereof.

The mechanism for transmitting the movements of the governor weights to the shaft 42 or other means to control the operation of the valve-gear or devices which more directly regulate the admission of motive fluid to the turbine or engine includes two vertical pins 43, 44, the pin 43 being mounted on an inwardly extending projection on the governor weight 24 and the pin 44 on a similar projection on the weight 25, Figs. 1 and 2. On these pins are mounted trunnion blocks 45 which are free to turn about a vertical axis when necessary, but are prevented from moving longitudinally by shoulders 46 and nuts 47 on said pins. Pivotally attached to the trunnions are links 48, 49, Figs. 1 and 2, arranged in pairs, the links of each pair extending toward each other at their outer ends which are mounted on the trunnions of a block 50 attached to the lower end of an axially located rod 51, Fig. 1. On the rod 51 is a thrust collar 52 situated between suitable washers carried by a casing 53 and forming a slip joint between the rotating and the non-rotating parts. The casing 53 is pivotally mounted in the forked end of the horizontal arm 54 of a bell crank lever pivoted at 55 in ball bearings 56 located in a lug formed on the casing 57. The casing 57 surrounds the governor parts and protects them from injury and from dirt and other foreign matter. The lower end of the arm 58 of the bell crank lever is connected with the shaft 42 by a universal connection 59. While a bell crank lever has been illustrated it is obvious that the rod 51 can be made to actuate other forms and arrangements of levers or like devices.

In Fig. 9 a modification of the previously described governor is shown in which two single links 60 are used in the place of the four links 48, 49 arranged in pairs. A universal or ball and socket joint 61 connects the lower ends of the links 60 with the governor weights. The upper ends of the links are pivoted on a pin 62 mounted in the forked end of an axially-extending connection 63 between the pin 62 and the end of a stud 64 adjustably mounted in the end of a lever arm 65 or other device forming part of any suitable means for transmitting motion from the governor to the valves or similar devices which control the supply of motive fluid to the turbine or engine. The inner end 66 of the stud 64 has a spherical bearing surface which engages a suitable ball bearing 67 in the end of the connection 63, thus providing for the relative angular movement of the lever and connection and also for their relative rotation. Provision is also made for insuring lubrication of the bearing surfaces of the connection 63 and its associated parts. An opening 68 in the upper end of the connection admits oil to the ball bearing 67. The oil rises in the bearing and in the recess 69 in the end 66 of the stud 64 until it reaches the level of the top of the tube 70 and flows from the lower end of the tube onto the joint between the links 60 and the connection 63, and then downward and outward to the other parts of the governor.

Assuming the parts of the governor to be in the position shown and the load on the turbine to increase, accompanied by a slight decrease in speed of the main and governor shafts, then the spring 26 will move the ends of the weights toward the axis of the governor as indicated by the arrows 71, the direction of rotation of the governor being indicated by the arrow 72. This movement of the weights causes the pins 43, 44 or the ball and socket joints 61 to move away from each other and in so doing to draw the lever arm 54 or the lever arm 65 downward and thereby through suitable connections to cause the valves or other admission devices to admit a large quantity of motive fluid. On the other hand, if the load decreases and the speed rises, the pins 43 and 44 or the joints 61 will move toward each other and by means of the mechanism previously described raise the end of the lever arms 54 and 56 and decrease the supply of motive fluid.

In accordance with the provisions of the patent statutes, we have described the principle of operation of our invention, together with the apparatus which we now consider to represent the best embodiment thereof; but we desire to have it understood that the apparatus shown is only illustrative, and that the invention can be carried out by other means.

What we claim as new and desire to secure by Letters Patent of the United States, is:

1. In a speed governor that rotates about a given axis, the combination of oppositely-disposed weights acting by centrifugal force and inertia, the outer faces of the weights lying in the same plane perpendicular to the axis of rotation and the inner faces lying in a plane parallel to the first plane, pivots for the weights, a spring device for opposing the tendency of the weights to move outwardly, links that connect the end of one weight which moves inwardly with the end of another weight which moves outwardly to insure corresponding movements of the weights, said device and links being arranged between said planes, coöperating members on adjacent ends of the weights which limit the movement of said weights, and means acted upon by the weights.

2. In a governor which rotates about a given axis, the combination of a rotating support, weights disposed on opposite sides of the axis and in approximately concentric relation to said axis, said weights comprising longitudinal members spaced apart and connected adjacent to the ends of the weights, the outer faces of said weights lying in the same plane perpendicular to the axis and the inner faces lying in a plane parallel to the first plane, pivots for the weights mounted on the support in parallel relation to the axis, a helical spring having its axis arranged midway between said planes and intersecting the axis of rotation, pivots between the ends of the spring and the weights that are located in the spaces between said members, a member that is connected to the apparatus to be governed, and links connecting the weights with said member.

3. In a governor which rotates about a given axis, the combination of weights disposed on opposite sides of the axis, each weight comprising longitudinal members spaced apart and connected adjacent to the ends of the weights, the outer faces of the weights lying in the same plane perpendicular to the axis of rotation and the inner faces lying in a plane parallel to the first plane, pivots for the weights, spring means, devices connecting the ends of the spring means to the weights, means connecting adjacent ends of the weights to cause similar movements of said weights, said spring means and the connecting means and devices being arranged between said planes, a member for transmitting motion from the governor to the apparatus to be governed, and links connecting the weights to said member.

4. In a governor which rotates about a given axis, the combination of weights disposed on opposite sides of the axis and in approximately concentric relation to said axis, the outer faces of the weights lying in the same plane perpendicular to the axis of rotation and the inner faces of the weights lying in a plane parallel to the first plane, pivots for the weights, spring means arranged between said planes and connected to the weights to oppose their outward movement, coöperating members on adjacent ends of the weights which limit the movement of said weights, and means for transmitting motion from the governor weights to the apparatus to be governed.

5. In a governor which rotates about a given axis, the combination of a rotating support, weights disposed on opposite sides of the axis, diametrically opposite pivots for the weights which are mounted on the support in parallel relation to the axis, a helical spring whose axis intersects the axis of rotation at right angles, pivots between the ends of the spring and the weights, links connecting the adjacent ends of the weights to cause them to move together, said links being parallel to the diameter on which the pivots are located, a member for transmitting motion from the governor to the apparatus to be governed, links connecting the weights with said member, the axes of the links being substantially at right angles to the axis of the spring, and coöperating projections on adjacent ends of the weights for limiting their movement.

6. In a governor which rotates about a given axis, the combination of two weights disposed approximately concentric to said axis, each weight comprising longitudinal members spaced apart and connected adjacent to the ends of the weights, the upper faces of the weights lying in the same plane at right angles to the axis of rotation and the lower faces lying in a plane parallel to the first plane, diametrically opposite pivots for the weights arranged parallel to the axis, means connecting one weight to the other to cause them to move together, a helical spring located within the zone of revolution of the weights with its axis intersecting the axis of rotation at right angles, means arranged in the spaces between said members for connecting the spring to the weights to oppose their outward movement, a member for transmitting motion from the governor to the apparatus to be governed, and links pivotally connected to the weights and said member.

7. In a governor which rotates about a given axis, the combination of a disk or support arranged at right angles to the axis, two weights oppositely disposed in approximately concentric relation to the axis and parallel to the disk, diametrically opposite pivots for the weights arranged on the disk in parallel relation to the axis, a helical spring diametrically arranged within the zone of revolution of the weights with its axis intersecting the axis of rotation at an angle to the diameter on which said pivots are located, knife-edge pivots between the ends of the spring and the weights, links connecting the adjacent ends of the weights to cause them to move together, said links being parallel to the diameter on which the pivots are located and arranged within the periphery of the weights, an axially extending connection for transmitting motion from the governor to the apparatus to be governed, and a link between each weight and said connection which is located in a plane substantially at right angles to the axis of the spring and connected to the weight by a ball and socket joint.

8. In a governor which rotates about a given axis, the combination of a disk or support at right angles to the axis, diametrically-opposite pivots on the disk with their axes perpendicular to said disk, two weights mounted on the pivots and arranged in substantially concentric relation to the axis, the upper and lower faces of the two weights lying in parallel planes perpendicular to the axis, a helical spring for opposing the outward movement of the weights that has its axis co-incident with a diameter at an angle to the diameter on which the pivots are located and between the planes of the upper and lower faces of the weights, knife-edge pivots between the ends of the spring and the weights, links connecting the adjacent ends of the weights that are arranged parallel to the diameter on which the pivots are located and between the planes of the upper and lower faces of the weights, an axially-arranged member for transmitting motion from the governor to the apparatus to be governed, pivots adjacent the lower faces of the weights arranged substantially in a plane through the axis of rotation at right angles to the axis of the spring, and links connecting the pivots with said member.

9. In a governor which rotates about a given axis, the combination of oppositely-disposed weights arranged in substantially concentric relation to the axis and having a removable screw plug in each end thereof for varying the mass of the weights, pivots for the weights, a helical spring having its ends connected to the weights to oppose their outward movement, links connecting the adjacent ends of the weights to cause similar movement thereof, and means for transmitting motion from the weights to the apparatus to be governed.

10. In a governor which rotates about a given axis, the combination of oppositely disposed weights arranged in substantially concentric relation to the axis, each weight comprising longitudinal members spaced apart and connected adjacent the ends of the weight, the outer faces of the weights lying in the same plane perpendicular to the axis of rotation and the inner faces of said weights lying in a plane parallel to the first plane, pivots for the weights intermediate their ends, the mass of the weights being so disposed about their pivots that they act by centrifugal force and inertia upon the governing mechanism, spring means connecting one end of one weight with the corresponding end of the other to oppose the outward movement thereof, pivots between the ends of the spring means and the weights that are located in the spaces between said members, an axially arranged member connected to the apparatus to be governed, and links pivotally connected to the member and the weights for transmitting the movements of the weights to said member.

11. In a governor which rotates about a given axis, the combination of oppositely-disposed weights arranged in substantially concentric relation to the axis, each weight comprising parallel longitudinal members connected adjacent the ends of the weight, the inner faces of the weights lying in the same plane perpendicular to the axis of rotation and the outer faces of said weights lying in a plane parallel to the first plane, pivots for the weights arranged intermediate their ends, the mass of the weights being so disposed about their pivots that they act both by centrifugal force and inertia on the governing mechanism, spring means connecting one end of one weight with the corresponding end of the other to oppose the outward movement thereof, knife-edge pivots between the ends of the spring means and the weights that are located in the spaces between said members, projections extending inwardly from two corresponding longitudinal members of the weights, an axially-arranged member connected to the apparatus to be governed, and links pivotally connected to the member and said projections to transmit the movements of the weights to said member.

In witness whereof, we have hereunto set our hands this seventh day of November, 1908.

RICHARD H. RICE.
J. G. CALLAN.

Witnesses:
 JOHN A. McMANUS, Jr.,
 HENRY O. WESTENDARP.